United States Patent

[11] 3,580,553

| [72] | Inventor | Daniel M. Urich<br>Hibbing, Minn. |
|---|---|---|
| [21] | Appl. No. | 824,397 |
| [22] | Filed | May 14, 1969 |
| [45] | Patented | May 25, 1971 |
| [73] | Assignee | Eveleth Taconite Company<br>Forbes, Minn. |

[54] GRATE STRIPPER FOR PELLETIZING MACHINE
7 Claims, 6 Drawing Figs.

[52] U.S. Cl. .................................................. 263/32,
34/117, 263/34
[51] Int. Cl. ................................................... F27b 7/02
[50] Field of Search ................................................... 263/32, 53,
44; 34/117; 266/21

[56] References Cited
UNITED STATES PATENTS

| 2,606,111 | 8/1952 | Lindemuth .................... | 263/32X |
| 2,978,239 | 4/1961 | Topp ............................ | 263/32 |

Primary Examiner—John J. Camby
Attorney—Yount and Tarolli

ABSTRACT: An improved pellet hardening machine or assembly includes a preheating section wherein pellets of iron ore are preheated and an indurating section wherein the preheated pellets are heated to a desired hardness. A stripper assembly is provided for removing pellets from a conveyor on which they are transported. The stripper assembly is colled by a flow of air from a pump or other source of air under pressure. This air is discharged from the striper assembly in jets or streams which promote fluidization of relatively fine particles of material carried by the conveyor.

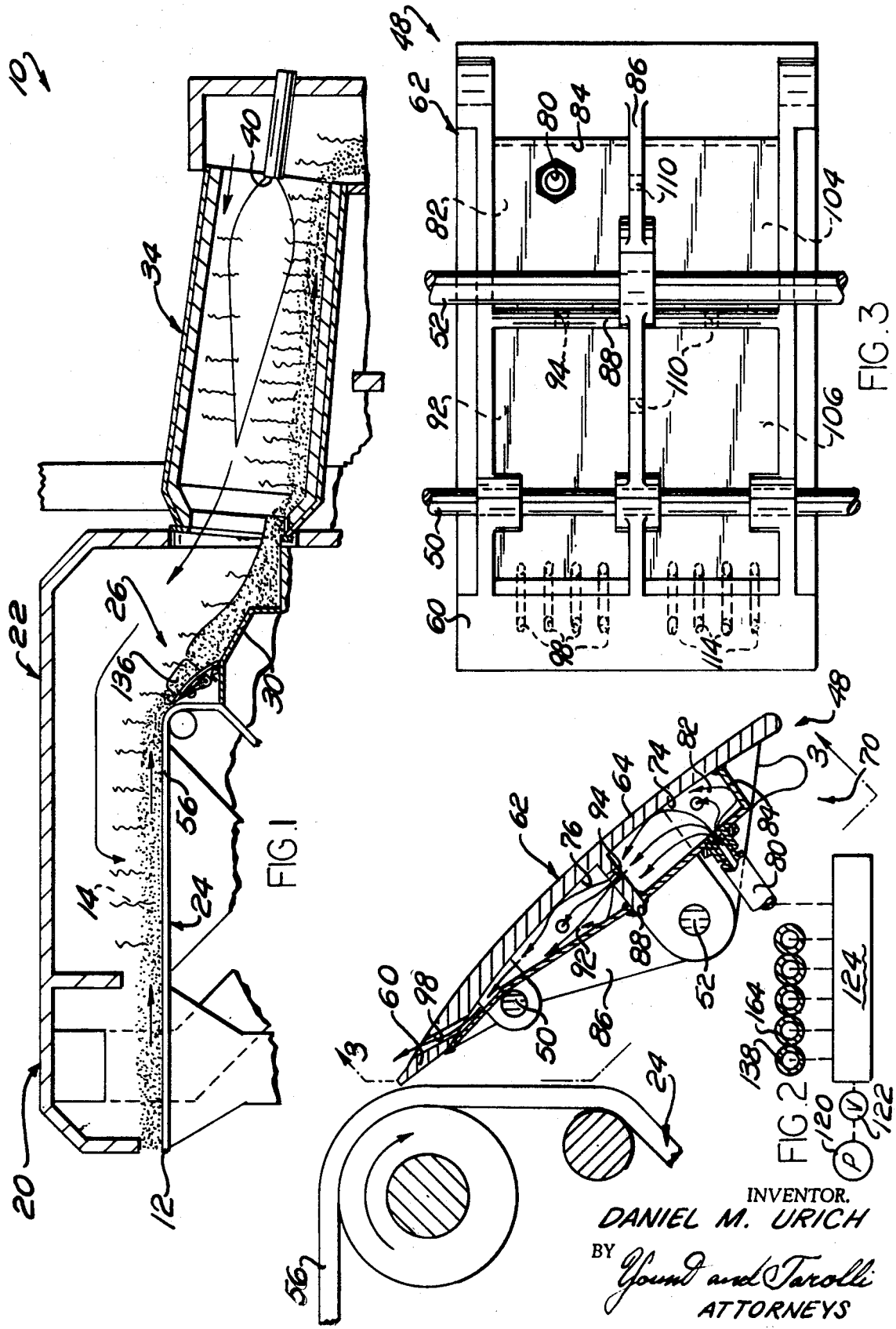

INVENTOR.
DANIEL M. URICH
BY Yount and Tarolli
ATTORNEYS

GRATE STRIPPER FOR PELLETIZING MACHINE

This invention relates generally to an apparatus for use in hardening iron ore pellets.

Taconite and other ores which require processing at very fine sizes are commonly agglomerated by a pelletizing process wherein green or wet pellets are formed and then fired or indurated to a desired hardness in an indurating or hardening machine. The pellet indurating or hardening machine usually includes drying and preheating furnaces wherein the green or wet pellets are heated while being transported on a conveyor. The preheated pellets are stripped or removed from the conveyor and are transferred to an indurating or final firing kiln wherein the pellets are fired or heated to the desired hardness.

Due to the relatively high temperatures which are present in the preheating furnace, usually above 1,750° F., known stripper assemblies for removing pellets from the conveyor, have a relatively short service life in this environment. Replacement of the stripper assemblies necessitates shutting down the operation of the pellet hardening machine or assembly with a resultant decrease in plant productive time and an increase in pelletizing costs. In addition, efficient operation of the pellet hardening machine is hindered by "ringing" or kiln accretion in the final firing kiln due to discharging of fine particles from the preheating furnace into the final firing kiln.

Accordingly, it is an object of this invention to provide a new and improved pellet hardening assembly having a stripper blade for removing heated pellets from a conveyor and means for directing a flow of fluid which is substantially cooler than the heated pellets across a surface of the stripper blade during operation of the pellet hardening assembly to thereby cool the stripper blade.

Another object of this invention is to provide a new and improved pellet hardening assembly in accordance with the next preceding paragraph and further including a side stripper blade for retaining the pellets against the sideward movement, the side stripper blade also being cooled by a flow of fluid during operation of the pellet hardening assembly.

Another object of this invention is to provide a new and improved pellet hardening assembly having a stripper blade for removing pellets from a conveyor and means associated with the stripper blade for providing a flow of fluid to promote fluidization of small or fine particles transported by the conveyor.

Another object of this invention is to provide a new and improved pellet hardening assembly having a stripper for removing pellets from a conveyor and means associated with the stripper for providing a flow of fluid which is cooler than the heated pellets along a surface of the stripper to thereby cool the stripper and for directing this fluid to promote fluidization of small or fine particles transported by the conveyor.

These and other objects and features of the present invention will become more apparent upon a consideration of the following description taken in connection with the accompanying drawings wherein:

FIG. 1 is a schematic illustration of a traveling grate-type indurating or hardening machine having a stripper assembly constructed in accordance with the present invention;

FIG. 2 is an enlarged schematic illustration of a portion of one stripper of the stripper assembly of FIG. 1;

FIG. 3 is a plan view, taken generally along the line 3-3 of FIG. 2, further illustrating the construction of the stripper;

Figure 4:
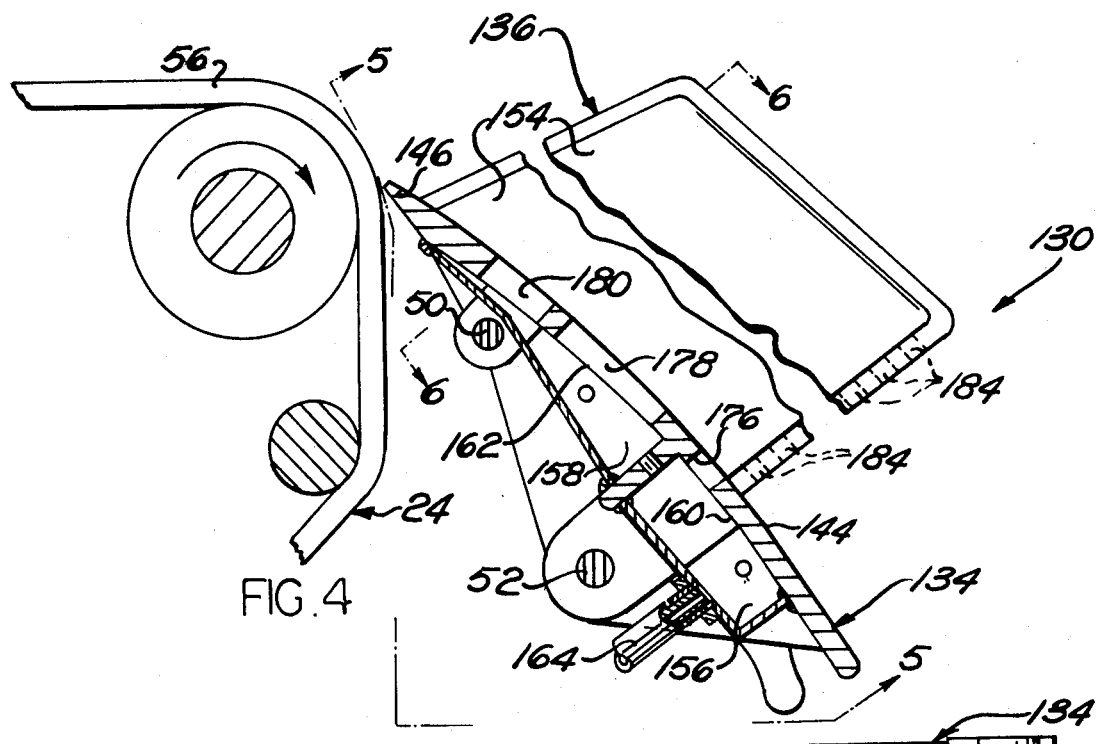
FIG. 4 is a sectional schematic illustration, generally similar to FIG. 2, illustrating the construction of a side stripper of the stripper assembly of FIG. 1.

While it is contemplated that the apparatus forming the subject matter of the present invention will be used in pelletizing plants processing many different types of pellets, the present invention is particularly well adapted to iron ore pelletizing processes wherein finely divided iron ore particles are formed into pellets which are hardened so that they can be utilized as a part of the charge for a blast furnace. Due to its low quality, the iron ore called taconite and found in the Mesabi Range is particularly well suited for beneficiation by a pelletizing process. The pelletizing process includes two basic steps, the formation of green or wet pellets and the firing or indurating of the green pellets to the desired hardness.

Assuming taconite pellets are to be formed, the crude ⅜ is first crushed to particles of approximately three-fourths of an inch or less. This crushed ore is then ground in a suitable manner, such as in a rod mill-ball mill circuit, to a fineness of about 325 mesh. The finely ground taconite ore is then magnetically concentrated and dehydrated or dewatered by passing through a thickener and a filter. The resulting filter cake or ore is broken up and mixed with an additive, such as bentonite, borax, or lime, and rolled into small, generally spherical shapes, by a snow-balling technique during what is commonly called a balling step in which green or wet pellets of from ⅜ inch to 1½ inches in diameter are formed.

The green or wet pellets are heat treated or indurated to a desired hardness to facilitate shipping and handling of the pellets. In the present instance, the pellets are heat treated in a traveling-grate type pellet indurating or hardening machine, indicated at 10 in FIG. 1, having an input at 12 wherein the green or wet pellets 14 are received in a drying furnace 20. The green or wet pellets 14 are moved through the drying furnace 20 to a preheating furnace 22 by a traveling grate or conveyor 24. The green or wet pellets 14 are heated to a temperature of approximately 700° F. in the drying furnace 20 before passing on into the preheating furnace 22 where they are heated to a temperature of from 1200° F. to 2100° F.

The heated pellets are removed or stripped from the conveyor 24 by a grate stripper assembly 26 constructed in accordance with the present invention. The pellets then move onto a transfer apparatus or chute 30 which conducts the pellets to a rotary indurating kiln or final firing section 34 of the traveling-grate kiln type pellet indurating or hardening machine 10. Rotation of the kiln 34 causes the dry or preheated pellets to move downwardly through the kiln 34 as they are fired or heated to a temperature of approximately 2400° F. under the influence of a heat source 40. This firing or heating of the preheated pellets 14 hardens them to withstand shipping stresses. The hardened pellets 14 then descend to cooling sections where they are cooled prior to shipping.

The stripper assembly 26 includes a plurality of central or main strippers 48 (see FIGS. 2 and 3) which remove or strip the preheated pellets from the conveyor 24. The main strippers 48 are mounted in lateral alignment on support bars 50 and 52 adjacent to the end of a horizontal run or length 56 of the conveyor 24. The pellets 14 are removed or stripped from the conveyor 24 by engagement with a solid or imperforate leading end portion 60 of a blade or body 62 of the stripper 48. The heated pellets then move across a generally arcuate outer surface 64 of the stripper blade 62 onto the transfer apparatus or chute 30.

Since the pellets 14 are heated to a relatively high temperature in the preheating furnace 22, i.e. to a temperature above 1,000° F. and usually to a temperature of about 2,000° F., the blade 62 is heated to a relatively high temperature during operation of the pellet hardening machine or assembly 10. At this high operating temperature, known stripper blades have had a relatively short service life. This short service life results from casting growth, thermal oxidation, and loss of structural strength in the stripper blade. To minimize the effect of the high temperature operating conditions on the stripper blade 62, fluid conduit means 70 conducts a flow of air along the stripper blade 62 to cool the stripper blade during operation of the pellet hardening assembly 10.

The fluid conduit means 70 directs a flow of air along inner surface areas 74 and 76 of the stripper blade 62. Since this air is substantially cooler than the pellets 14 which engage the outer surface 64 of the stripper blade 62, the air absorbs heat from the stripper blade and thereby cools it. In the embodiment of the invention illustrated in FIG. 2, air is conducted through a conduit or tube 80 to a chamber 82 formed by a suitable panel or housing wall 84 and ribs 86 and 88 of the blade 62. This flow of air quickly pressurizes the chamber 82 to provide for a flow of air into a chamber 92 which is connected in fluid communication with the chamber 82 by a passage 94 through the rib 88. Fluid is discharged from the chamber 92 and the stripper assembly 62 through passages 98 extending through the blade 62 between the inner surface 76 and outer surface 64.

The stripper 48 includes panels or walls defining additional chambers 104 and 106 (see FIG. 3) between inner surfaces of the blade 62 and the ribs 86 and 88. The chambers 104 and 106 are connected in fluid communication by suitable passages 110 through the ribs 86 and 88. This arrangement of chambers provides for a pressurization of the chamber 82 and a subsequent flow of air under pressure to the other chambers 92, 104 and 106 to promote even cooling of the stripper blade 62. The air flows from the chamber 106 through passages 114 extending between the inner surface of the blade 62 and the outer surface 64 of the blade.

During operation of the pellet hardening machine or assembly 10, air is forced by a pump 120 (FIG. 2) through an open control valve 122 to a manifold 124. This air then flows through suitable conduits, similar to the conduit 80 to associated strippers which are substantially identical to the stripper 48. The air then flows along the inner surfaces of these strippers to cool the strippers and is discharged from the strippers through passages, similar to the passages 98 and 114, adjacent to the leading end portions of stripper blades. Of course, heat is conducted from the relatively hot blades to the cool air flowing along the inner surfaces of the blades to thereby cool the blades even though the leading end portions and outer surfaces of the blades are continuously being engaged by hot pellets stripped or removed from the conveyor 24. The pump 120 can be sized to provide for an adequate flow of air through tubes to any desired number of main or central strippers.

During the preheating of the pellets on the conveyor 24, fine particles of iron ore and other matter are usually deposited on the conveyor. These fine particles or pieces of material tend to cause "ringing" or kiln accretion in the final heating or firing section 34. To minimize the amount of small particles entering firing station 34 and "ringing" of the kiln, the small particles are fluidized and drawn up into high temperature dust cyclones (not shown).

The air directed through the passages 98 and 114 toward the leading end portion 60 of the stripper blades 62 (see FIGS. 2 and 3) tends to promote fluidization of these relatively small particles, and thereby tends to minimize "ringing" in the final heating or firing section 34. Thus during operation of the pellet hardening assembly or machine 10, the air which is conducted along the inner surfaces 74 and 76 of the blade 62 to cool the blade is directed toward the conveyor 24 by the passages 98 to promote a fluidization of any small particles which may be on the conveyor 24. It should be noted that the passages 98 and 114 are positioned in an angular relationship with the horizontal length 56 of the conveyor 24 at a bend in the conveyor where the fine particles tend to move away from the conveyor.

When the pellets are being stripped or removed from the conveyor 24 by the stripper assembly 26, (see FIG. 1) the pellets may tend to move sidewardly of the stripper assembly 26. To prevent some of the pellet 14 from falling off the side of the stripper assembly 26, the stripper assembly 26 includes a pair of upwardly projecting side strippers located at opposite side edges of the stripper assembly. The side stripper 130 (FIG. 4) includes a main blade 134 for removing pellets from the conveyor 24 and side or vertically extending blade 136 for retaining the pellets against sideward movement.

The main stripper blade 134 is connected by a fluid conduit 138 (see FIGS. 2 and 5) with the manifold 124. Air from the fluid conduit 138 flows into a plurality of chambers formed on the underside of the stripper blade 134 and is discharged from these chambers through passages 140 (FIG. 5) extending from inner surfaces of the blade 134 to an outer surface 144 (FIG. 4) adjacent to a leading end portion 146 of the blade 134. Therefore, it can be seen that the stripper blade 134 is cooled by a flow of air along the inner surfaces of the blade in the same manner as in which the stripper blade 62 is cooled. This flow of air is discharged by the passages 140 to promote a fluidization of fine or small particles in the manner previously explained.

Figure 5:
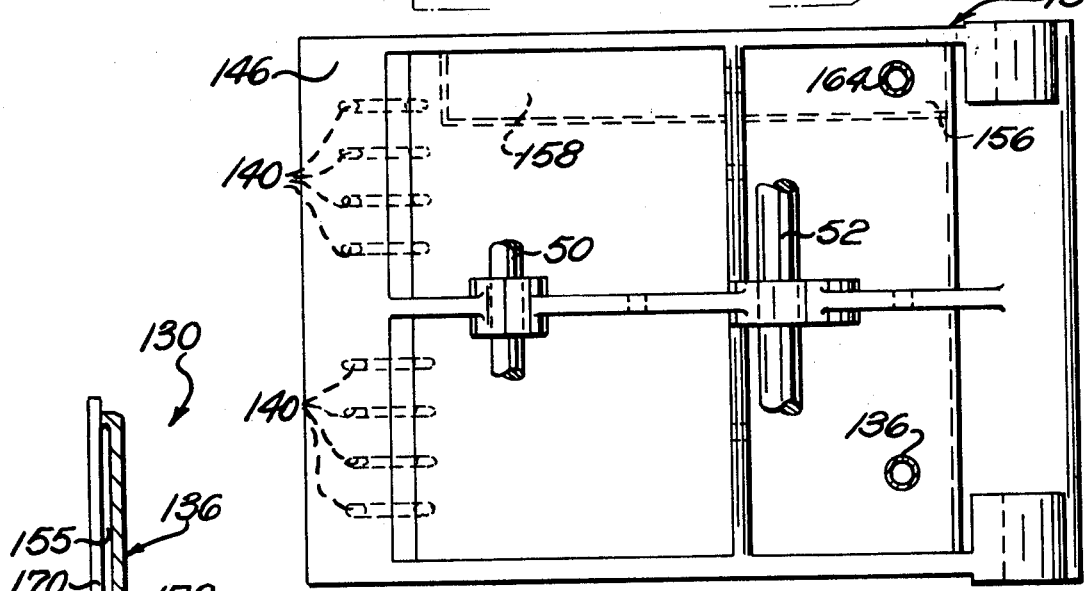
FIG. 5 is a plan view, taken generally along the line 5-5 of FIG. 4, further illustrating the construction of the side stripper.
Figure 6:
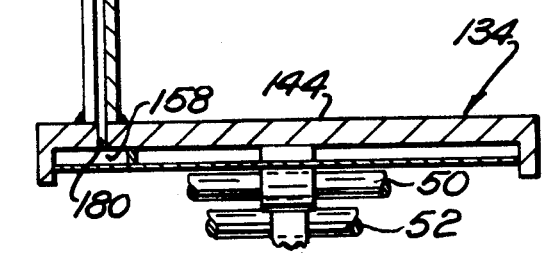
FIG. 6 is a sectional view, taken generally along the line 6-6 of FIG. 4, illustrating the relationship of a side or vertical stripper blade to a main stripper blade of the side stripper.

The side blade 136 has an outer surface 154 which extends outwardly from the surface 144 of the main blade 134 and forms a barrier to prevent the heated pellets from moving or falling sidewardly off the side stripper 130. Of course, when the heated pellets engage the surface 154 of the side blade 136, the side blade is heated to a relatively high temperature. To provide for cooling of the side blade 136, the side blade includes a chamber 155 (FIG. 6) through which a flow of air is directed. A plurality of auxiliary chambers 156 and 158 (see FIGS. 4 and 5) are formed adjacent to inner or under surfaces 160 and 162 of the main stripper blade 134. These chambers are connected in fluid communication with the manifold 124, or other suitable source of air under pressure, by a fluid conduit 164. The chambers 156 and 158 are connected in fluid communication with the air chamber 155 formed between opposite side sections or panels 170 and 172 of the side blade 136 (FIG. 6) by suitable slots 176, 178 and 180 formed in the main stripper blade 134. The air flows from the chamber 155 through holes or apertures 184 in the trailing end portion of the side blade 136 (FIG. 4).

The side stripper 130 includes a main blade 134 for stripping or removing pellets from the conveyor 24 and a side blade 136 for preventing the heated pellets from falling off the side stripper 130. Both the main blade 134 and side blade 150 are cooled by a flow of air or other fluid during operation of the pelletizing machine or assembly 10. This flow of air is advantageously discharged from the stripper blades in such a manner as to promote fluidization of any fine or small particles which may be formed during the pelletizing process. These fluidized particles can then be readily drawn up into suitable high temperature cyclones to minimize "ringing" or kiln accretion in the final firing section 34. It should be noted that although the stripper assembly 26 has been illustrated herein as being located in the preheating furnace 22, it is contemplated that the stripper assembly 26 could be used at other locations in the pellet hardening machine or assembly 10.

I claim:

1. A pellet hardening assembly for processing green pellets to form pellets of a desired hardness, said pellet hardening assembly comprising a preheating section for heating the green pellets, an indurating section for heating the preheated pellets to a desired hardness, conveyor means for transporting the pellets in said pellet hardening assembly, and stripper means for aiding in the removal of heated pellets from said conveyor means, said stripper means including blade means disposed closely adjacent to said conveyor means for engaging heated pellets to strip them from said conveyor means, said blade means having an outer surface across which heated pellets move upon being stripped from said conveyor means by said blade means and an inner surface disposed opposite from said outer surface, wall means cooperating with said inner surface of said blade means to define a chamber, passage means extending from said chamber through said blade means to said outer surface of said blade means to enable fluid to be exhausted from said chamber, and fluid conduit means connected with a source of fluid under pressure and said chamber for directing a flow of fluid which is substantially cooler than the heated pellets to said chamber during operation of said pellet hardening assembly to thereby provide a flow of fluid across said inner surface of said blade means and through said passage means to cool said blade means.

2. A pellet hardening assembly for processing green pellets to form pellets of a desired hardness, said pellet hardening assembly comprising a preheating section for heating the green pellets, an indurating section for heating the preheated pellets to a desired hardness, conveyor means for transporting the pellets in said pellet hardening assembly, and stripper means for aiding in the removal of heated pellets from said conveyor means, said stripper means including blade means disposed closely adjacent to said conveyor means for engaging heated pellets to strip them from said conveyor means, and fluid conduit means connected with a source of fluid under pressure and operatively connected with said blade means for directing a flow of fluid which is substantially cooler than the heated pellets across a surface of said blade means during operation of said pellet hardening assembly to thereby cool said blade means, said surface of said blade means along which fluid is directed being an inner surface and said blade means including an outer surface which is engaged by heated pellets from said conveyor means, said fluid conduit means including a plurality of passages extending through said blade means from said inner surface to said outer surface, said passages intersecting said outer surface of said blade means adjacent to said conveyor means to promote fluidization of fine particles of material transported by said conveyor means.

3. A pellet hardening assembly for processing green pellets to form pellets of a desired hardness, said pellet hardening assembly comprising a preheating section for heating the green pellets, an indurating section for heating the preheated pellets to a desired hardness, conveyor means for transporting the pellets in said pellet hardening assembly, and stripper means for aiding in the removal of heated pellets from said conveyor means, said stripper means including blade means disposed closely adjacent to said conveyor means for engaging heated pellets to strip them from said conveyor means, fluid conduit means connected with a source of fluid under pressure and operatively connected with said blade means for directing a flow of fluid which is substantially cooler than the heated pellets across a surface of said blade means during operation of said pellet hardening assembly to thereby cool said blade means, and side stripper means extending transversely of said blade means for retaining heated pellets against movement in a direction transverse to the direction in which the heated pellets are transported by said conveyor means, said side stripper means including an outer surface which is engaged by the heated pellets, said fluid conduit means being operatively connected with said side stripper means for directing a flow of fluid which is substantially cooler than the heated pellets across an inner surface of said side stripper means to thereby cool said side stripper means.

4. A pellet hardening assembly as set forth in claim 3 wherein said side stripper means is mounted on said blade means and is connected in fluid communication with said source of fluid by passages extending through said blade means.

5. A pellet hardening assembly for processing green pellets to form pellets of a desired hardness, said pellet hardening assembly comprising a preheating section for heating the green pellets, an indurating section for heating the preheated pellets to a desired hardness, conveyor means for transporting the pellets in said pellet hardening assembly, and stripper means for aiding in the removal of heated pellets from said conveyor means, said stripper means including blade means disposed closely adjacent to said conveyor means for engaging heated pellets to strip them from said conveyor means, and fluid conduit means connected with a source of fluid under pressure and operatively connected with said blade means for directing a flow of fluid which is substantially cooler than the heated pellets across a surface of said blade means during operation of said pellet hardening assembly to thereby cool said blade means, said blade means including a solid leading edge portion disposed closely adjacent to said conveyor means for stripping heated pellets from said conveyor means, said fluid conduit means including chamber means which is at least partially defined by said surface of said blade means and passage means extending through said blade and terminating immediately behind said leading edge portion for conducting fluid from said chamber means to promote fluidization of fine particles of material transported by said conveyor means while said leading edge portion of said blade means strips the relatively large heated pellets from said conveyor means.

6. A pellet hardening assembly for processing green pellets to form pellets of a desired hardness, said pellet hardening assembly comprising a preheating section for heating the green pellets, an indurating section for heating the preheated pellets to a desired hardness, conveyor means for transporting the pellets in said pellet hardening assembly, and stripper means for aiding in the removal of heated pellets from said conveyor means, said stripper means including blade means disposed closely adjacent to said conveyor means for engaging heated pellets to strip them from said conveyor means, and fluid conduit means connected with a source of fluid under pressure and operatively connected with said blade means for directing a flow of fluid which is substantially cooler than the heated pellets across a surface of said blade means during operation of said pellet hardening assembly to thereby cool said blade means, said blade means including a plurality of ribs projecting from said surface of said blade means, said fluid conduit means includes panel means cooperating with said ribs to form a plurality of chambers, tubing means for connecting one of said chambers in fluid communication with the source of fluid communication with said one chamber, and second fluid passage means extending through said blade means from at least some of said other chambers for directing a flow of fluid toward a leading end portion of said blade means to thereby promote the fluidization of relatively fine particles transported by said conveyor means.

7. A pellet hardening assembly for processing green pellets to form pellets of a desired hardness, said pellet hardening assembly comprising a preheating section for heating the green pellets, an indurating section for heating the preheated pellets to a desired hardness, conveyor means for transporting the pellets and small pieces of material associated with the pellets, blade means having a leading end portion for engaging the heated pellets to remove them from said conveyor means, and fluid conduit means extending through said blade means for directing a flow of fluid under pressure toward said end portion of said blade means to promote fluidization of the small pieces of material transported by said conveyor means.